(12) United States Patent
Latiri

(10) Patent No.: US 7,415,866 B2
(45) Date of Patent: Aug. 26, 2008

(54) DEVICE FOR DETERMINING THE CENTER OF GRAVITY OF AN OBJECT

(76) Inventor: Mondher Latiri, 781 Fong Lin Road, Sec 4, Ta-Liao, 831 Kaohsiung (TW)

( * ) Notice: Subject to any disclaimer, the term of this patent is extended or adjusted under 35 U.S.C. 154(b) by 291 days.

(21) Appl. No.: 11/353,182

(22) Filed: Feb. 14, 2006

(65) Prior Publication Data
US 2007/0186626 A1 Aug. 16, 2007

(51) Int. Cl.
*G01M 1/00* (2006.01)
*A63B 53/00* (2006.01)
*G01B 1/00* (2006.01)

(52) U.S. Cl. .................. 73/65.03; 73/65.01; 33/508
(58) Field of Classification Search ..... 73/65.01–65.05; 33/508
See application file for complete search history.

(56) References Cited

U.S. PATENT DOCUMENTS

| | | | | |
|---|---|---|---|---|
| 4,212,193 A | * | 7/1980 | Turley | 73/65.07 |
| 4,603,577 A | * | 8/1986 | Johnson et al. | 73/65.03 |
| 4,890,246 A | * | 12/1989 | Oldendorf et al. | 702/101 |
| 4,951,765 A | * | 8/1990 | Naito et al. | 177/211 |
| 4,977,969 A | * | 12/1990 | Leisinger et al. | 177/50 |
| 5,309,753 A | | 5/1994 | Johnson | |
| 5,528,927 A | * | 6/1996 | Butler et al. | 73/65.03 |
| 5,814,773 A | * | 9/1998 | Latiri | 177/171 |
| 6,407,349 B1 | * | 6/2002 | Stahl | 177/210 C |
| 6,472,618 B1 | * | 10/2002 | Izumo et al. | 177/210 EM |
| 6,835,143 B2 | | 12/2004 | Shiraishi | |
| 2005/0011250 A1 | | 1/2005 | Nesbit et al. | |

FOREIGN PATENT DOCUMENTS

WO WO 98/31433 7/1998

OTHER PUBLICATIONS

Auditor Precision Golf club head CG locator PDF, Feb. 11, 2006 <http://web.archive.org/web/20060211155308/www.golfmechanix.com/Products.asp?PdctCat=07>.*
Website, "WWW.GOLFMECHANIX.COM/", The Auditor Electronic Flex Sorter, Zone Profiler and Spine Locator, Two Sheets.

* cited by examiner

*Primary Examiner*—Edward Lefkowitz
*Assistant Examiner*—Jonathan Dunlap
(74) *Attorney, Agent, or Firm*—Richard C. Litman

(57) ABSTRACT

The device for determining the center of gravity of an object measures the moments of the object (e.g., golf club head, or other irregularly shaped object) as it is positioned in three mutually orthogonal axes. As the weight of the object is known, the moments may be divided by the weight to determine the precise arm from the scale to the center of gravity of the object. A line is marked across the exterior surface of the object along each orthogonal axis, with the intersection of the lines defining the center of gravity of the object. A programmable electronic scale is preferably used, but other mechanical and electronic scales may be used as well. The knowledge of the precise location of the center of gravity of the object enables a technician to add or remove weight in precise amounts and locations to adjust the center of gravity precisely.

17 Claims, 10 Drawing Sheets

DEVICE FOR DETERMINING THE CENTER OF GRAVITY OF AN OBJECT

BACKGROUND OF THE INVENTION

1. Field of the Invention

The present invention relates generally to weight measurement scales and the like. More specifically, the present invention is a device for determining the center of gravity of an object that includes a weight scale and apparatus, which may be a programmable electronic load scale, for determining the arm and moment of an object of known weight secured thereto, in three mutually orthogonal axes. This information is used to determine the center of gravity of the object along each axis, thereby determining the center of gravity of the three-dimensional object.

2. Description of the Related Art

The determination of the center of gravity of an irregular three-dimensional solid object can be a complex project. Yet, there are many fields in which it is quite important, if not critical, to know the precise center of gravity of an object. An example of such a field is the game of golf, or more particularly the adjustment and modification of clubs used in the game.

As the game has evolved over the years, a number of relatively fine nuances have been discovered which aid the accuracy of the player. Among these is the discovery or realization of the importance of the precise placement of the center of gravity of the club head. Many, if not most, club heads may be adjusted insofar as their mass and/or center of gravity is concerned, particularly so-called "metal woods," i.e., larger club heads formed of a hollow metal shell which serve the function of the older style drivers and related clubs having heads formed primarily of wood. For example, if the center of gravity is positioned too far outwardly toward the "toe" of the club, that portion of the club head will tend to lag behind the center of the club head during the swing, resulting in a slice or fade tendency. The opposite effect, i.e., a hook or draw, occurs when the center of gravity of the club head is positioned inboard of the center of the club head. Vertical and forward and rearward placement of the center of gravity also affects the path and angle of the club head during the swing, and the corresponding path of the ball at and after impact, primarily affecting the loft of the ball.

While the above points are reasonably well known in golf and can be used to "fine-tune" an individual club or set of clubs (including some irons), the precise center of gravity of the club head must be known before it can be adjusted with any degree of precision. In other words, regardless of the accuracy of the location and amount of weight added or subtracted to or from a club head, the result is imprecise if the starting point was not precisely known.

Thus, a device for determining the center of gravity of an object solving the aforementioned problems is desired.

SUMMARY OF THE INVENTION

The device for determining the center of gravity of an object includes a sensitive scale and balance beam to which the object of interest is attached. The opposite end of the balance beam engages the scale. When the length of the two beam portions to each side of the fulcrum is known, along with the weight of the object being measured, the moment of the object may be determined. This allows the length of the beam to the center of gravity of the object to be determined. The object may be adjustably positioned in three mutually orthogonal axes, thereby defining a single point for the center of gravity of the object.

A mechanical arm assembly extends upwardly from an orthogonal track structure, and holds a marking instrument (pen, etc.) therein. The tip of the marking instrument may be adjusted in any of three mutually orthogonal axes corresponding to the adjustment axes for the object secured to the adjustable end of the balance beam. The marking instrument is used to plot a series of mutually orthogonal lines across the exterior of the object, with the intersection of the planes defined by the lines defining a point located at the center of gravity of the object.

The assembly comprising the scale, balance beam, mechanical arm assembly, and orthogonal track structure for the arm assembly is secured to a base plate or table which may be leveled precisely to provide the necessary accuracy. The scale may be any suitable type, but is preferably a programmable electronic load cell device, which may be programmed with the lengths of the two ends or portions of the balance beam and the weight of the object being measured, with the device utilizing this data to automatically determine the length of the arm from the fulcrum to the center of gravity of the object being measured. Adjustment of the orientation of the object at the free end of the balance beam and repeating the operation enables the apparatus to pinpoint the precise center of gravity of the object. The mechanical arm assembly is used to mark a line defining a center of gravity plane after each orientation of the object, with the three mutually orthogonal lines defining a point at the center of gravity of the object.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a device or mechanism for determining the center of gravity of an object. The device is particularly well suited for the determination of the center of gravity of an irregularly shaped object, such as a golf club head or the like. The device may make use of virtually any type of weighing scale, but most preferably uses a programmable electronic load cell type scale in order to automate the process.

Figure 1:
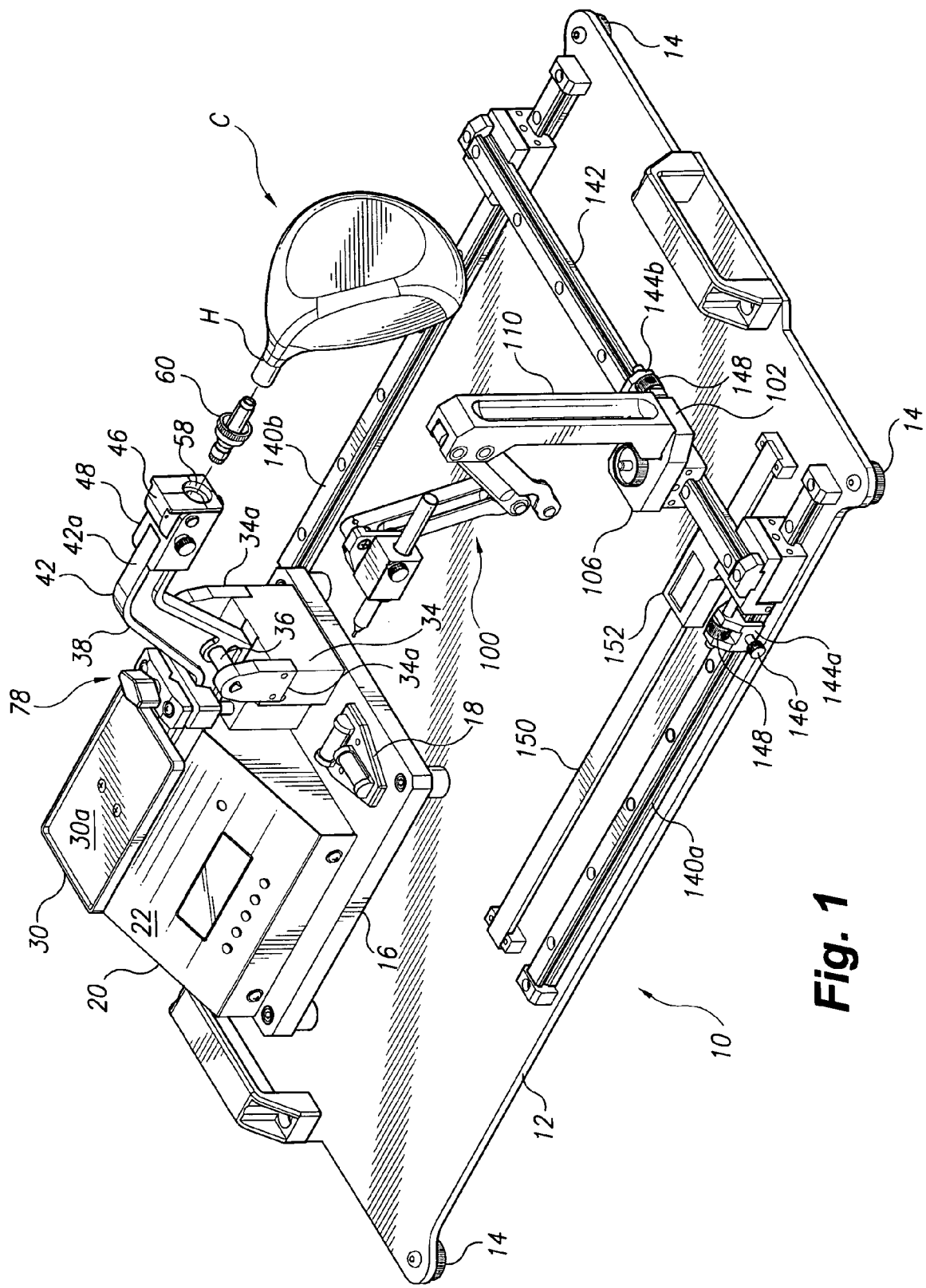
FIG. 1 is a perspective view of a device for determining the center of gravity of an object according to the present invention.

FIG. 1 of the drawings provides a perspective view of the overall apparatus 10, with a golf club head C shown separated from the apparatus but in position for installation. A base platform 12 serves as a mounting plate or surface for the remainder of the components of the device. The base platform 12 includes a series of adjustable leveling feet or pads 14 at the corners thereof. The leveling pads 14 may utilize conventional threaded adjustment, or other adjustment means as desired. A weighing scale platform 16 is immovably affixed atop the base platform 12, with the planes of the two platforms 12 and 16 being parallel to one another. Level indicating means is provided on the weighing scale platform 16. The level indicating means may comprise a pair of mutually orthogonal level vials 18, or alternatively a circular "bulls eye" level, etc., as desired. Observation of the two level vials 18 permits the base platform 12 to be adjusted to level by means of the leveling pads 14 noted above.

A weighing scale apparatus 20 is affixed to the top of the weighing scale platform 16. The weight scale 20 preferably comprises a programmable electronic load cell device, as shown in the various drawings, but other mechanical and/or balance scales may be used alternatively, if so desired. A cabinet 22 containing the electronic componentry, input controls, and display is also provided. One advantage provided by the programmable electronic scale apparatus 20 is the automated calculation of the arm or distance from the fulcrum to the center of gravity of the object being measured, once the weight of the object and lengths of the balance beam arms have been entered into the electronic scale 20. Another advantage to such an electronic scale device 20 is that it may be adapted to have a double action, i.e., to provide an indication of either upward force or downward force (weight) thereon. The object of interest is removably installed upon the opposite end of a balance beam, which engages the scale device 20 during center of gravity calculation, thereby causing the balance beam to impart an upward force to the scale device 20. This is explained in detail further below.

Figure 2:
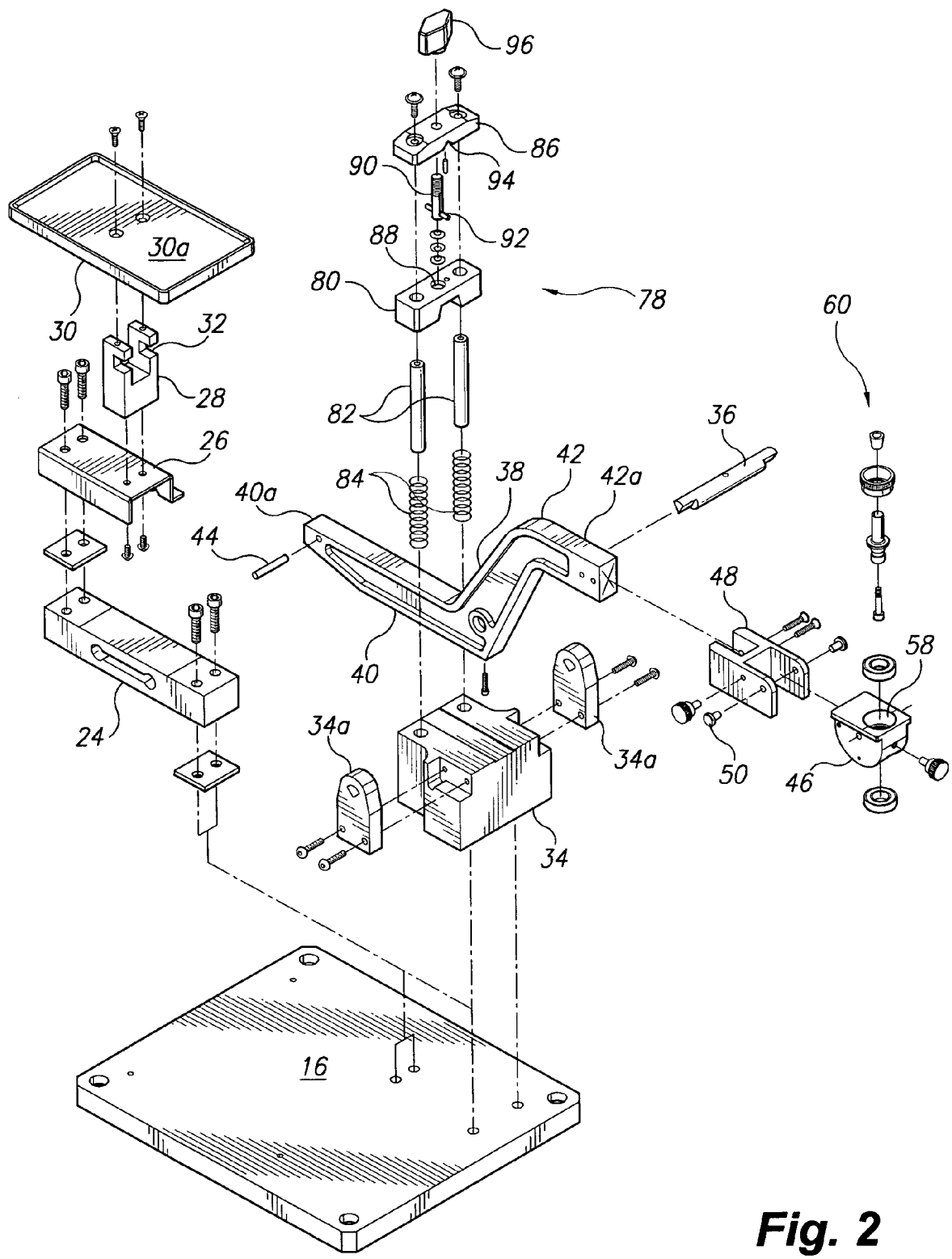
FIG. 2 is an exploded perspective view of the weight measurement scale and balance beam assembly of the device for determining the center of gravity of an object according to the present invention.

FIG. 2 provides an exploded perspective view of the weight scale platform 16 and much of the componentry attached directly or indirectly thereto, excepting the cabinet 22. One end of a load cell 24 is affixed atop the weight scale platform 16, with the opposite end supporting a weighing pan assembly. The weighing pan assembly includes a bracket 26 to position the center of the weighing pan over the center of the load cell 24, a weighing pan support 28 extending upwardly from the bracket 26, and the weighing pan 30. The weighing pan support 28 includes one or more notches or cutouts 32 therein, which engage one end of the balance arm and accept force in the upward direction. The weighing pan 30 includes an upper surface 30a and opposite lower surface 30b, with the weighing pan support 28 being affixed to the lower surface 30b of the pan 30.

Figure 3A:
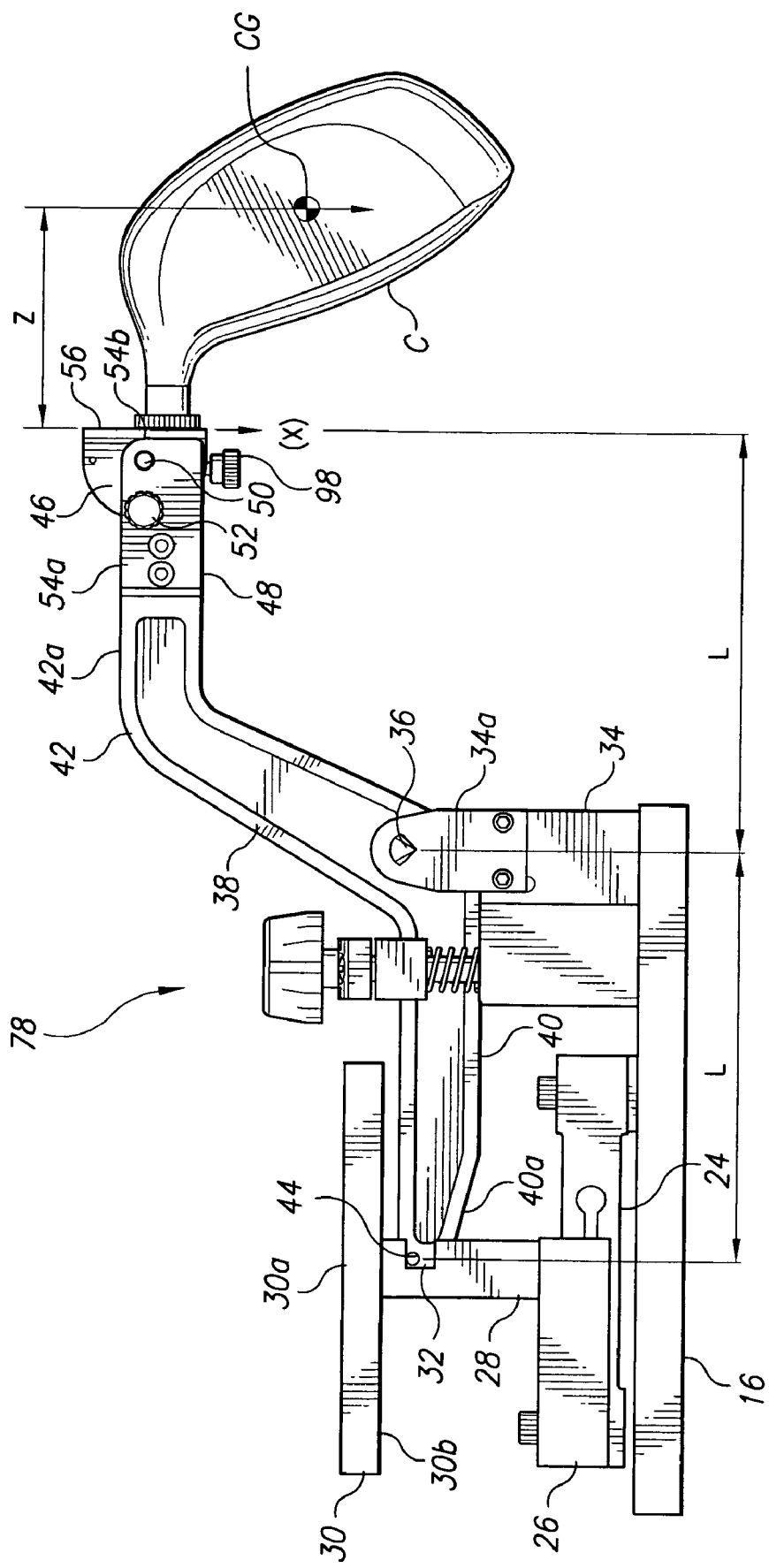
FIG. 3A is a front elevation view of the scale and balance beam assembly of FIG. 2 being used to measure the moment arm of a golf club head relative to the X axis thereof.
Figure 3B:
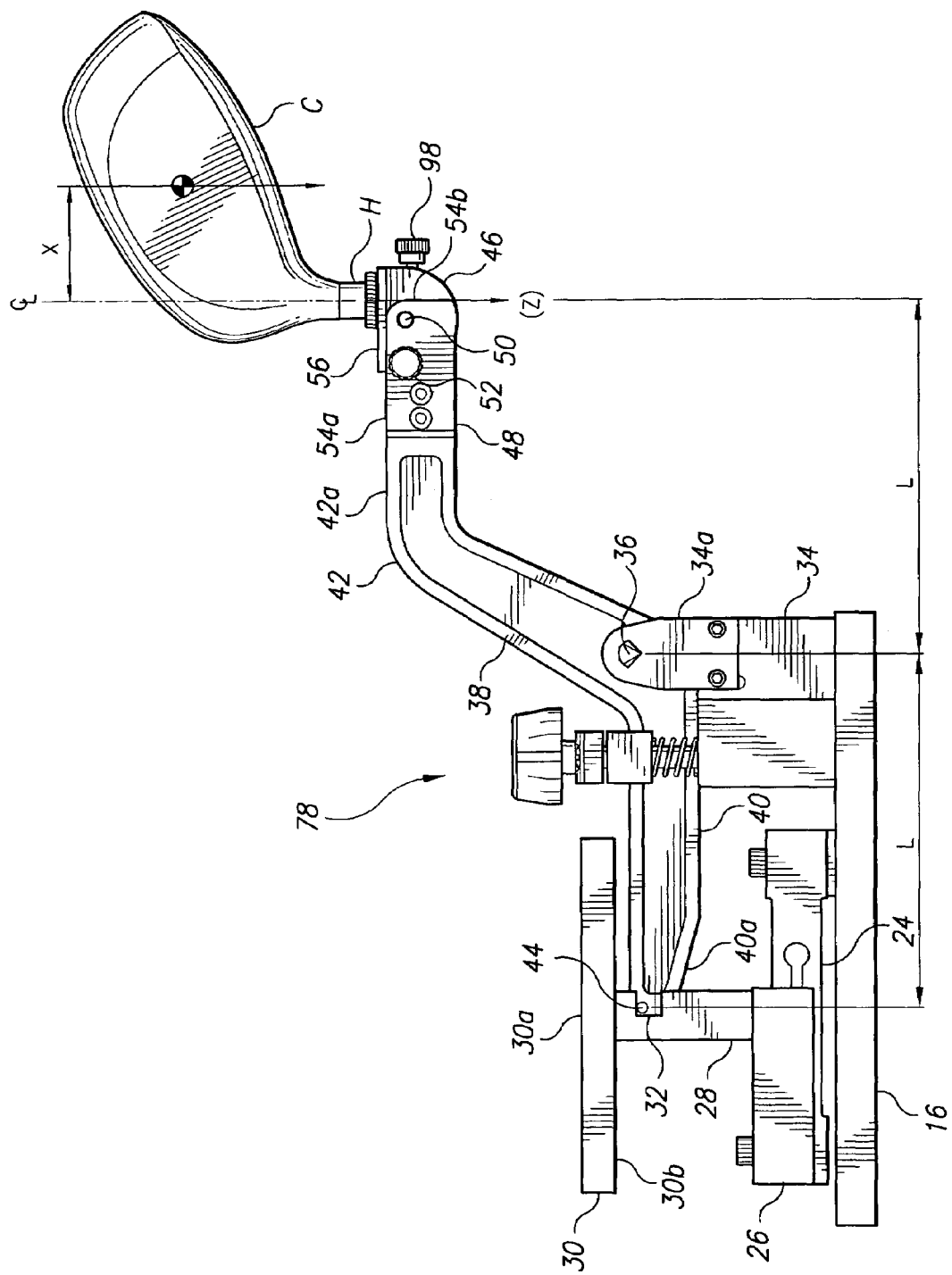
FIG. 3B is a front elevation view of the scale and balance beam assembly of FIG. 2 being used to measure the moment arm of the head relative to the Y axis thereof.
Figure 3C:
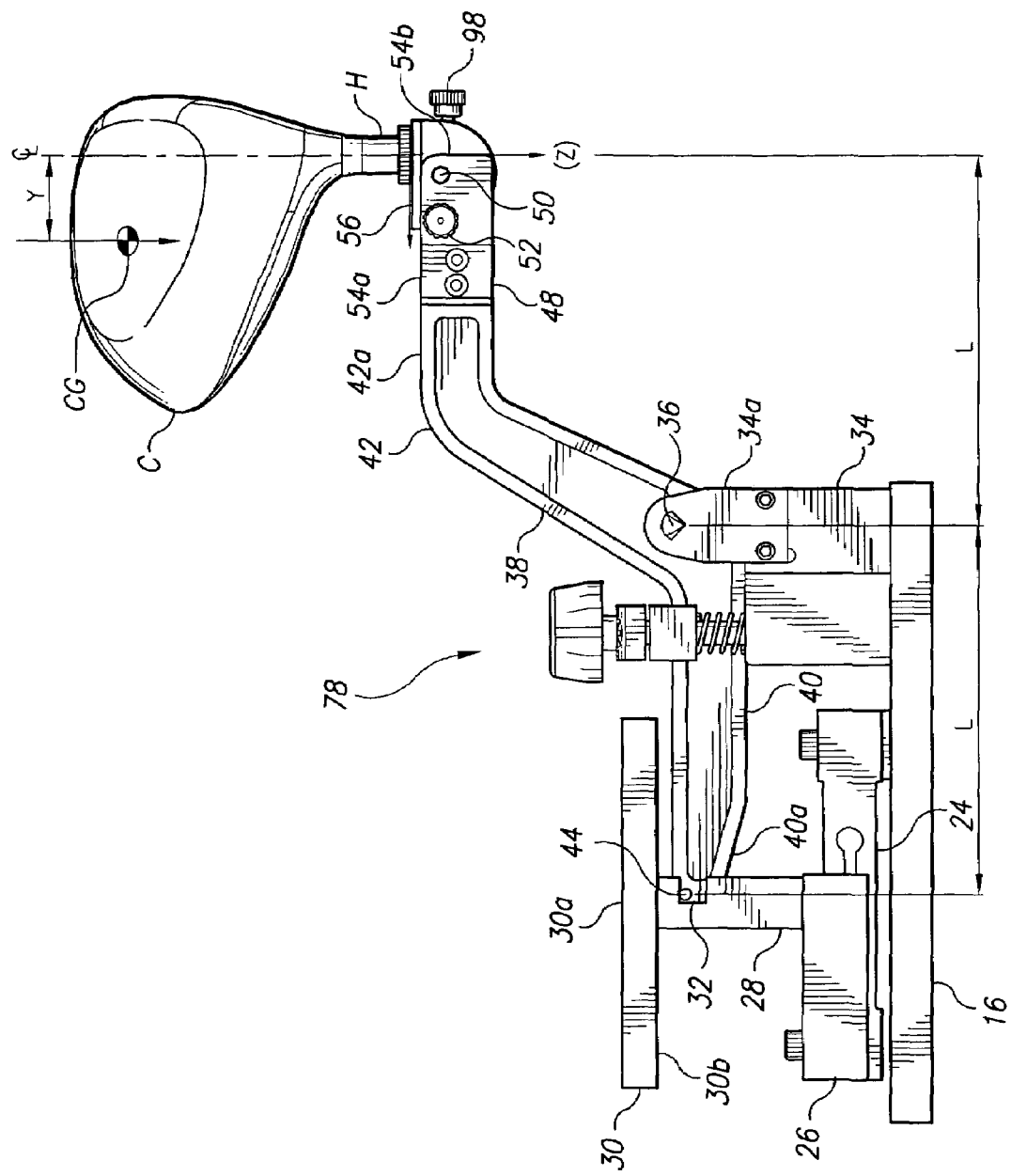
FIG. 3C is a front elevation view of the scale and balance beam assembly of FIG. 2 being used to measure the moment arm of a golf club head relative to the Z axis thereof.

A fulcrum assembly also extends upwardly from the weight scale platform 16, offset from the weight scale 20. The fulcrum assembly includes a fulcrum block 34 from which a pair of spaced apart supports 34a extends, with a balance arm pivot 36 passing through the two supports 34a. The pivot 36 is preferably provided with relatively sharp knife edges on the lower portion of each end, with the edges engaging relatively sharp V-shaped notches in the lower portions of the balance beam pivot passages of the two fulcrum supports 34a. This is best seen in FIGS. 3A through 3C. This structure minimizes friction to the greatest degree practicable for providing accurate measurements.

The balance beam pivot 36 passes through an elongate balance beam 38, with the balance beam 38 having a scale engagement arm portion 40 extending in one direction from the fulcrum pivot 36 and an object attachment arm portion 42 extending in the opposite direction from the pivot 36. The scale engagement arm 40 includes a distal scale engagement end 40a, through which a lateral weight pan support engagement pin 44 passes to engage the notches or slots 32 of the weight pan support 28 between the scale or its load cell 24 and the overlying weight pan 30. The substantially level relationship between the balance beam pivot 36 and weight pan support engagement pin 44 results in essentially no lateral play or friction between the pin 44 and the notches 32 during operation, thereby improving accuracy of the device.

The opposite distal object attachment end 42a of the beam 38 is preferably raised or elevated somewhat above the scale engagement arm portion 40, in order to provide clearance above the underlying base platform 12 for an object (e.g., golf club head H) secured thereto. Alternatively, the scale 20 assembly could be elevated and the balance beam 38 formed as a straight beam, but the offset elevations between the two ends 40a and 42a allows the scale 20, and particularly the weighing pan 30, to be lower, thereby lowering the overall height of the device for a more compact configuration.

The object attachment end 42a of the beam 38 includes a gauging block 46 adjustably secured thereto, shown generally in FIGS. 1 and 2, but shown in greater detail in FIGS. 3A through 3C and FIG. 4. The gauging block 46 is secured to the object attachment end 42a of the beam 38 by an attachment bracket 48, with a pair of opposed pivot pins 50 pivotally securing the block 46 to the bracket 48. A setscrew 52 or the like may be tightened to lock the gauging block 46 in the selected position as desired. The attachment bracket 48 includes orthogonally opposed edge pairs, respectively 54a and 54b, which engage the laterally opposed stop flanges 56 of the gauging block 46 at its extremes of travel to stop the block 46. Thus, the gauging block 46 cannot rotate or pivot beyond a range of 90° between the orthogonal stop edges 54a and 54b of the attachment bracket 48, but may be locked in either a substantially horizontal or vertical orientation (within the slight arcuate travel of the balance beam 38) as limited by the flange stop edges 54a and 54b.

The gauging block 46 also includes an object attachment passage 58 formed therethrough, with its axis perpendicular to the plane defined by the stop flanges 56. The passage 58 is formed to removably accept an object attachment fitting therein, e.g., the golf club head hosel pin adaptor assembly 60 shown in detail in FIG. 4. Bearing means, e.g., a pair of axially spaced ball bearings 62, are installed within the gauging block passage 58 to minimize the friction of the adaptor assembly 60 therein as it pivots due to the weight of the golf club head C or other object attached thereto.

Figure 4:
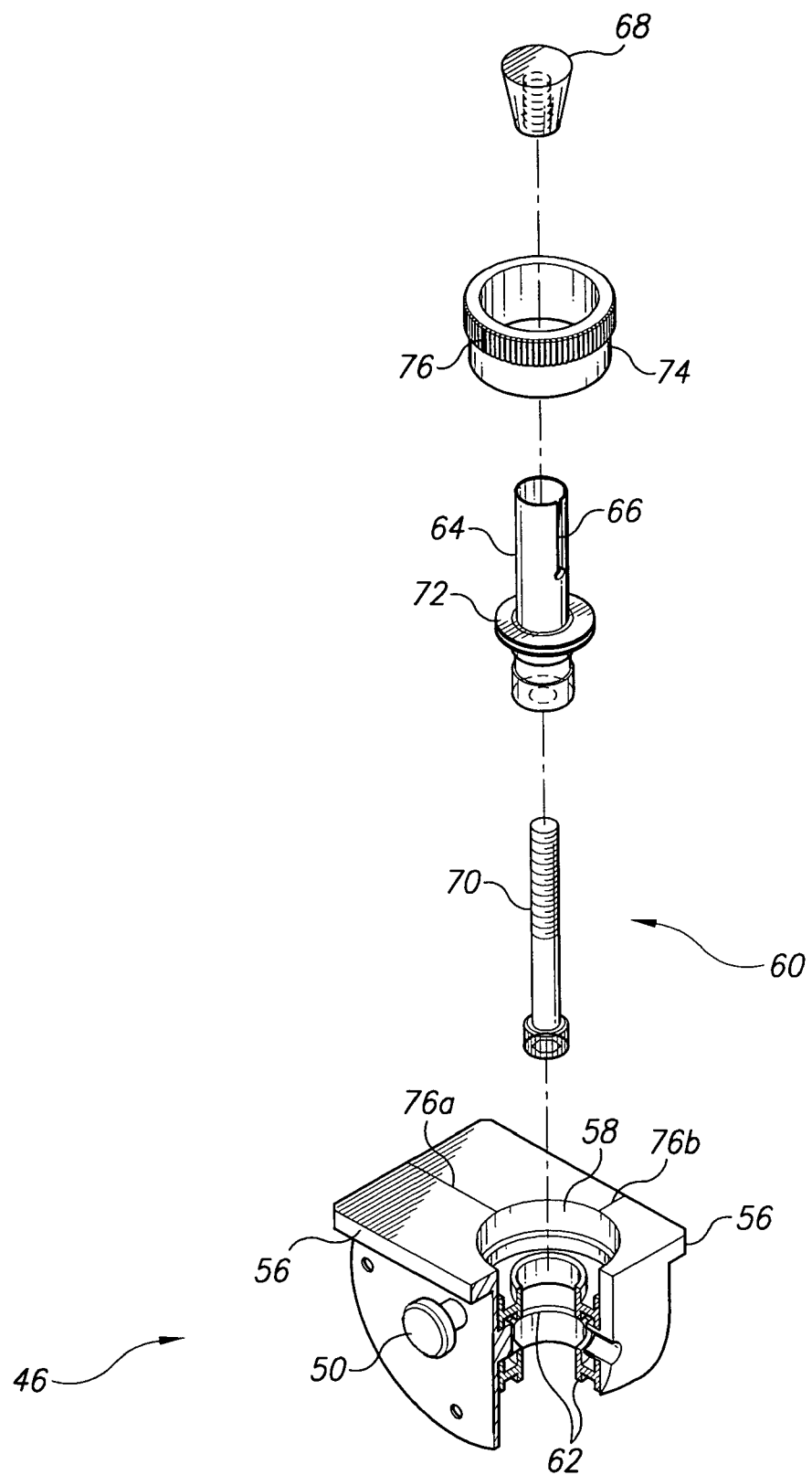
FIG. 4 is an exploded perspective view of the gauging block and club head hosel pin adapter used for precisely securing and positioning the club head to the free end of the balance beam in a device for determining the center of gravity of an object according to the present invention.

Details of the adaptor assembly 60 are shown most clearly in FIG. 4. A tubular body or collet 64 includes at least one axial slot 66 formed along its length, allowing the walls of the tube 64 to spread apart. A conical section insert 68 fits within the slotted end of the collet 64, with a threaded bolt 70 passing through the unslotted end of the collet 64 and threading into the conical insert 68. As the bolt 70 is tightened, the conical insert 68 is pulled into the slotted end of the collet 64, thereby spreading the walls to grip firmly within the hosel H passage of the golf club head C, or other object secured thereto as desired.

The collet 64 further includes a radial flange 72 therearound, with an index ring 74 installing on the radial flange 72. The index ring 74 may be rotated about the radial flange 72, but some friction is provided between the ring 74 and flange 72 so that the ring 74 will remain in position relative to the flange 72 and collet body 64 when set. An alignment index 76 is provided on the exterior surface of the ring 74, with the index 76 oriented perpendicular or orthogonal to the plane defined by the gauge block stop flanges 56 when the adaptor assembly 60 is installed within the gauge block 46. However, the index ring 74 may be rotated to align the index mark 76 as desired during use, e.g., to align with one of the corresponding marks 76a or 76b formed on the face of the gauging block 46 to set the vertical orientation of the object suspended from the adaptor assembly, somewhat as shown in FIG. 3C of the drawings and explained further below. The friction between the index ring 74 and collet flange 72 assures that the index mark 76 will remain in the same orientation relative to the object to which the collet 64 is secured, regardless of the pivotal orientation of the collet 64 and object (golf club head, etc.) relative to the gauging block 46.

The balance beam and scale assembly, including the balance beam 38, gauging block 46 installed thereon, and any object of interest temporarily secured to the gauging block, comprise a relatively delicate assembly. Excessive jarring or force during use, e.g., when installing or removing objects upon or from the gauging block, could cause the scale 20 to drift from proper calibration and/or misalign the edges of the balance arm pivot 36 in their passages within the fulcrum supports 34a. Accordingly, a balance beam latch and centering assembly 78 is provided to secure the balance beam 38 to the underlying fulcrum block 34 when actual measurements are not being made. The beam latch and centering assembly 78, shown most clearly in FIGS. 2 and 3A through 3C, includes a beam clamp 80, which straddles the balance beam 38 adjacent the pivot 36, with the beam clamp 80 sliding upon a pair of guides 82 which extend upwardly from the fulcrum block 34. A coil spring 84 is installed about each of the guides 82, to urge the beam clamp 80 upwardly and clear of the balance beam 38 when the beam clamp is not compressed against the beam to lock the beam in place against the fulcrum block.

A beam latch bridge 86 is immovably affixed across the upper ends of the two guides 82, with the beam clamp 80 being adjustably captured between the bridge 86 and the balance beam 38. The bridge 86 includes an unthreaded passage 88 therethrough, with a threaded beam clamp screw 90 passing through the bridge passage 88. Movement of the screw 90 is purely axial and the screw is prevented from rotating within the passage 88 by a lateral pin 92 therethrough, which is captured within a slot 94 extending laterally across the beam latch bridge 86. A knob 96 is axially affixed to the bridge 86, i.e., it cannot lift or separate from the bridge but is free to rotate relative to the bridge, thereby driving the screw 90 upwardly or downwardly. The knob 96 is threaded onto the upper end of the screw 90, with the screw 90 rising and descending in the fixed bridge 86 as the knob 96 is turned one way or the other.

Figure 6:
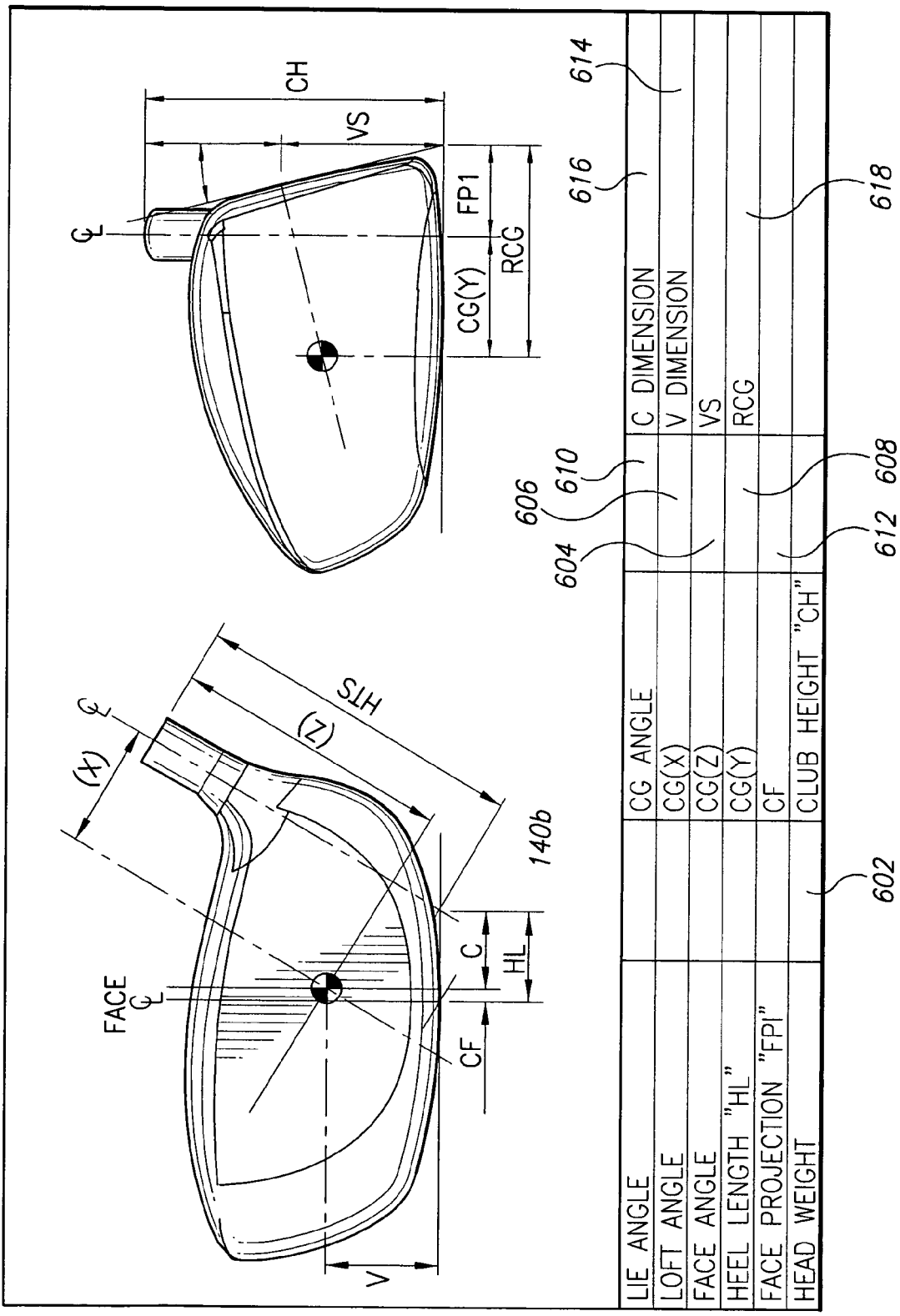
FIG. 6 is a specification sheet used to record the various data associated with a golf club head being measured by a device for determining the center of gravity of an object according to the present invention.

FIGS. 3A through 3C illustrate the operation of the device 10, as described to this point. In order to determine the center of gravity of an object, the weight of the object must be known. This is accomplished by placing the object upon the upper surface 30a of the weight or scale pan 30, and operating the scale 20 to determine the weight. The balance beam 38 is normally locked down by means of the beam latch assembly 78 during such weighing operations when an object is placed atop the scale pan 30 for weighing, in order to avoid any interference with the weighing operation due to the scale engagement end 40a of the balance beam 38. The club head weight (or other object, as desired) is automatically recorded in the memory of the scale 20 when the scale is a computerized electronic scale. The club head weight is also noted on the chart or table 600 of FIG. 6, in the head weight position 602.

Once the weight of the object is known, the object (e.g., golf club head C) is removably and adjustably secured to the object attachment end 42a of the balance beam 38 by means of the gauging block 46 and hosel attachment or adaptor assembly 60. Initially, the gauging block is oriented as shown in FIG. 3A, i.e., with the hosel pin adaptor assembly and hosel H extending horizontally from the object attachment end 42a of the balance beam 38. The hosel pin adaptor assembly 60 (shown more clearly in FIG. 1 and in the exploded detail view of FIG. 4) rotates freely within the bearings 62 of the gauging block 46, allowing the club head C to orient itself generally as shown in FIG. 3A due to gravity. The index ring 74 (FIG. 4) is rotated to align the index mark 76 with the alignment mark 76a of the gauging block 46, for future reference. The balance beam latch 78 is then unlocked to release the balance beam 38 and allow the weight of the club head C to register on the scale 20.

It will be seen that the weight of the club head C extending from the object attachment arm 42 of the balance beam 38 will impart an upward or lifting force upon the lower surface 30b of the weight pan 30 by means of the pin 44 engaging the notch 32 formed in the weight pan support 28. As the load cell 24 and electronic scale 20 are double acting, i.e., they register force in either the upward or downward direction, the device operates both to measure the weight of the club head C (or other object) placed atop the weight pan 30, and to measure the weight of an object extending from the object attachment arm 42 of the balance beam 38 due to the corresponding upward force imparted at the scale engagement end 40a of the balance beam.

The upward force is dependent upon two factors, i.e., the weight of the club head C at the opposite end of the balance arm 38, and the total length of the arm or distance comprising the balance beam attachment arm 42 and the distance Z from the end of the arm 42 to the center of gravity CG of the club head C. Although the CG of the club head C is not yet known, all of the other factors required to determine the CG along the Z axis, as shown in FIG. 3A, are known.

These factors comprise (a) the length L of the scale engagement arm 40 to the vertically oriented face of the gauging block 46, (b) the upward force on the underside of the weight pan 30 as measured by the scale 20, and (c) the weight of the club head C as previously measured. These three factors may be applied to a weight and balance equation in the conventionally known manner to arrive at the total length L of the object attachment arm 42 plus the distance Z from the end of the arm 42 and its gauging block 46 to the center of gravity CG.

Subtracting the known length L of the object attachment arm 42, provides the distance Z for the center of gravity CG of the club head C in the plane extending through the height of the club head from the hosel H to the sole of the club head, i.e., in the plane illustrated in FIG. 3A. This result is entered in the appropriate position 604 of the table 600 of FIG. 6. A computerized electronic scale, such as the scale 20 illustrated in FIG. 1 of the drawings, may make this calculation automatically once the appropriate arm lengths and the club head weight have been entered. Alternatively, the calculations may be accomplished manually if a mechanical scale is used.

It will be noted that the lengths L of the two opposed portions of the balance beam, i.e., the scale engagement arm 40 and object attachment arm 42 (including the length of the attachment bracket 48 to its vertical edge 54b) are identical to one another. While it is not essential that the two arm lengths be identical to one another, this does simplify manual calculations. In the case of a programmable electronic scale 20, identical or unequal arm lengths are just as easily entered into the device.

The process is repeated for the other two axes as shown in FIGS. 3B and 3C. First, the balance beam latch assembly 78 is secured by turning the knob 96 to compress the balance beam clamp 80 against the compression of the springs 84 to secure the scale engagement arm 40 of the balance beam 38 against the underlying fulcrum base or block 34. This disengages the engagement pin 44 of the scale engagement arm 40 from the weight pan support 28, thus assuring that no excessive forces will be imparted to the load cell 24 and/or other critical components of the scale assembly while the orientation of the club head C is readjusted.

The gauging block 46 is reoriented as shown in FIG. 3B, i.e., with the hosel pin adaptor 60 and club head hosel H secured thereon oriented vertically to determine the center of gravity of the club head C in the "X" dimension, i.e., in the plane extending from the hosel to the toe of the club head. Precise orientation of the club head C is assured by means of the lock screw 98 extending from the gauging block 46, preventing the hosel pin adaptor 60 from rotating within the bearings 62 of the gauging block 46 when the lock screw 98 is secured. The balance arm latch knob 96 is then loosened to free the balance arm 38, and the upward force imparted by the weight of the club head C and its arm, resulting from the distance L and the additional distance X from the end of the arm assembly to the center of gravity of the club head, is measured. The distance X of the center of gravity of the club head from the centerline of the hosel H is computed as described above for the determination of the center of gravity CG in the Z dimension shown in FIG. 3A, and the number is noted in the CG(X) position 606 of the table 600 of FIG. 6.

The procedure is repeated essentially as described above for the Z and X axes, shown in FIGS. 3A and 3B, to determine the center of gravity location in the Y axis, as shown in FIG. 3C. Once the balance beam 38 has been secured as described above, the club head C is rotated through 90 degrees to reorient its axis perpendicular to the orientation shown in FIG. 3B. This new orientation for the determination of the center of gravity CG relative to the Y axis (the plane passing forwardly and rearwardly from the face to the back of the club head) is shown in FIG. 3C. The index mark 76 provided on the index ring 74 of the hosel pin adaptor assembly 60 may be used to align the club head C precisely from the orientation shown in FIG. 3B to the orientation shown in FIG. 3C. Once the club head C has been reoriented as shown in FIG. 3C, the same calculations used to determine the plane of the center of gravity CG in the Z and X axes may be used to determine the CG relative to the Y axis. It will be noted that the distance Y in FIG. 3C moves the center of gravity CG closer to the fulcrum of the balance arm 38, and thus must be subtracted from the arm length L, rather than added as in the determination of the Z and X axes CG shown in FIGS. 3A and 3B. Otherwise, the procedure is the same. The result is noted in the CG(Y) position 608 in the table 600 of FIG. 6.

Once the center of gravity has been determined in the three mutually orthogonal planes of the X, Y, and Z axes, the location or alignment of the planes must be indicated across the club head C or other object being measured. This is accomplished by means of an adjustably positionable articulated arm assembly 100, illustrated in detail in FIGS. 5A and 5B, and an orthogonal track system for the arm assembly, shown in the overall perspective view of FIG. 1. The track assembly adjustably positions the arm assembly 100 generally opposite the object attachment end 42a and gauging block 46 of the balance arm 38, and thus adjacent the golf club head C or other object secured to the gauging block 46, in order to make further measurements of the club head or object and to mark the center of gravity planes thereon. The arm assembly 100 is shown displaced to the left from the end of the balance arm in FIG. 1, for clarity in the drawing FIG.

The arm assembly 100 includes a track mount 102 having a channel 104 formed thereunder, with the channel engaging one of the tracks (described in detail further below). A base plate 106 is pivotally secured atop the track mount 102, and may be locked in position relative to the track mount 102 by means of a threaded clamp screw 108. A rigid upright support 110 extends from the arm assembly base plate 106. A pair of parallel proximal arms 112a and 112b is affixed to the upper end of the support 110 by corresponding horizontal pivots, with a pair of parallel distal arms 114a and 114b extending from the proximal arms by means of horizontally disposed pivots.

The provision for two parallel proximal arms 112a, 112b and two parallel distal arms 114a, 114b assures that the distal ends of the distal arms will always articulate in only two degrees of freedom, i.e., the horizontal and vertical planes defined by the arm sets 112a through 114b when the track mount 102 is locked to the underlying track and the base plate 106 is clamped immovably to the track mount 102. This results in movement of the distal ends of the distal arm set 114a, 114b generally toward and away from the object attachment end 42a of the balance beam 38 (and an object secured thereto) and in the vertical plane when the arms are aligned generally with the vertical plane of the balance beam. This allows an implement secured to the distal ends of the two distal arms 114a, 114b to be moved into contact with an object secured to the object attachment end 42a of the balance beam 38 and to articulate vertically relative to the object, as is necessary for making certain measurements of the object and marking the lines for the planes in which the center of gravity of the object lies and/or marking other reference lines.

The distal ends of the two distal arms 114a and 114b include a fitting 116 providing for the interchangeable attachment of a marking implement therein. The fitting 116 is pivotally secured to its arm end attachment plate 118, with a spring loaded latch button or pin 120 securing the fitting 116 in the horizontal orientation (i.e., with its receptacle or passage oriented horizontally) as desired. The pin 120 may be pulled from the attachment plate 118 to allow the fitting 116 to pivot about its horizontal attachment axis to the distal arm end attachment plate 118. An implement holder or sleeve 122 inserts removably into a passage or receptacle 124 in the fitting 116, and holds a marker M (felt tip pen, etc.) therein. This is used to mark the alignment marks along the surface of the golf club head H (or other object) to indicate the planes of the center of gravity of the object, or other reference markings as desired.

Figure 5A:
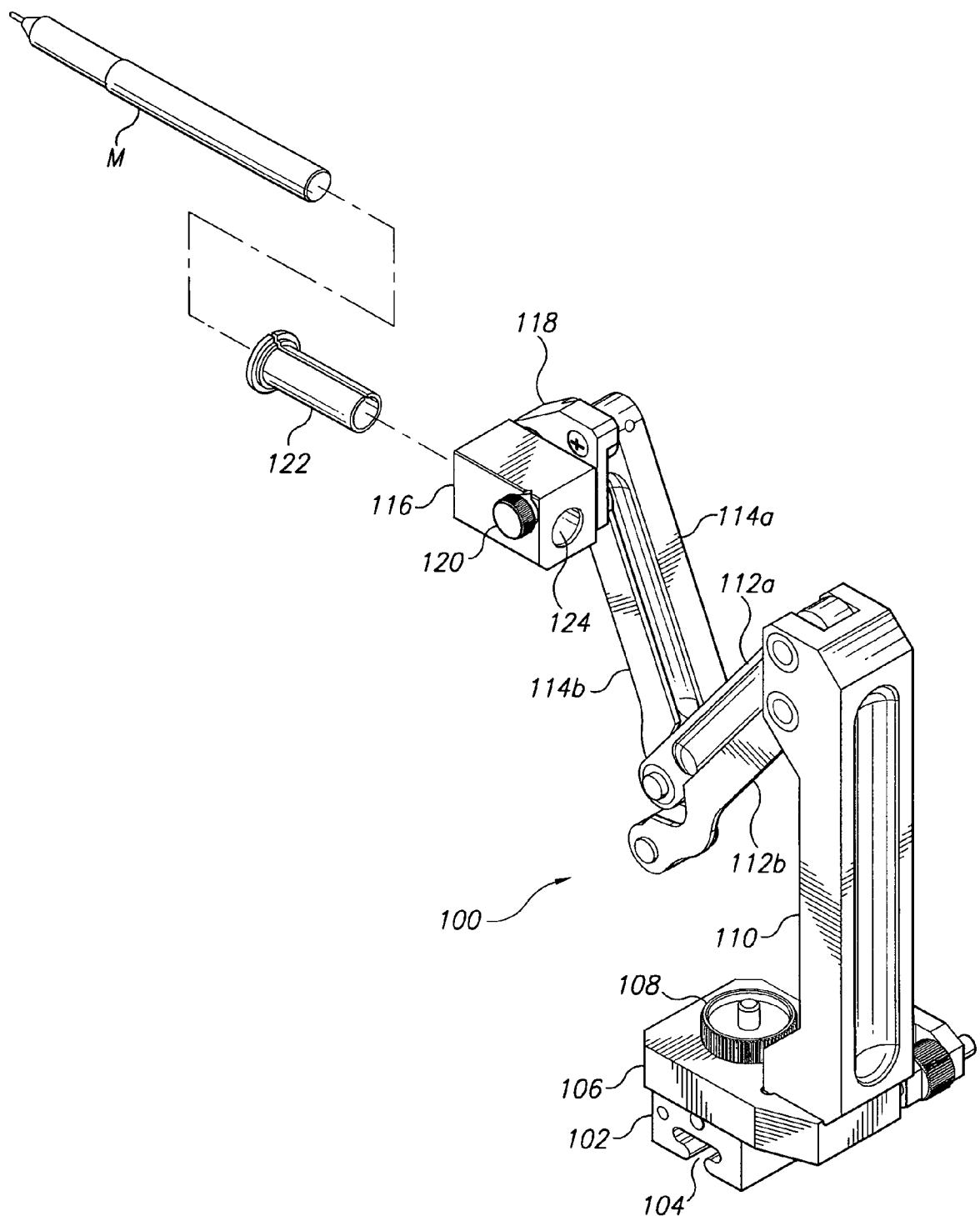
FIG. 5A is a perspective view of the mechanical arm assembly used to hold a marking instrument for marking center of gravity reference lines upon the object in a device for determining the center of gravity of an object according to the present invention for determining the center of gravity of an object according to the present invention, with the marking instrument and attachment sleeve shown separated from the arm.
Figure 5B:
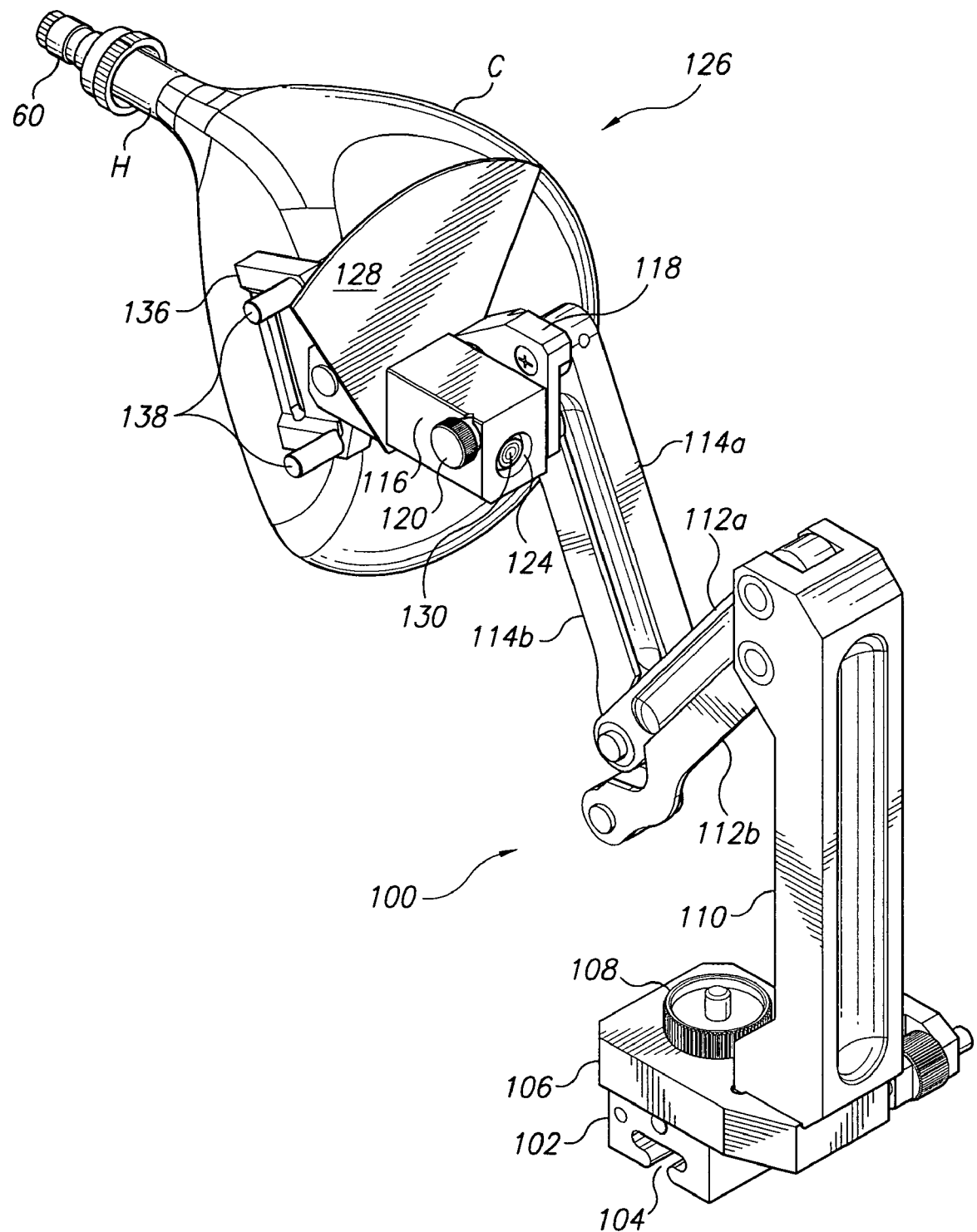
FIG. 5B is a perspective view of the arm assembly of FIG. 5A, showing its use with a protractor device for measuring the face angle of a golf club head in various orientations.
Figure 5C:
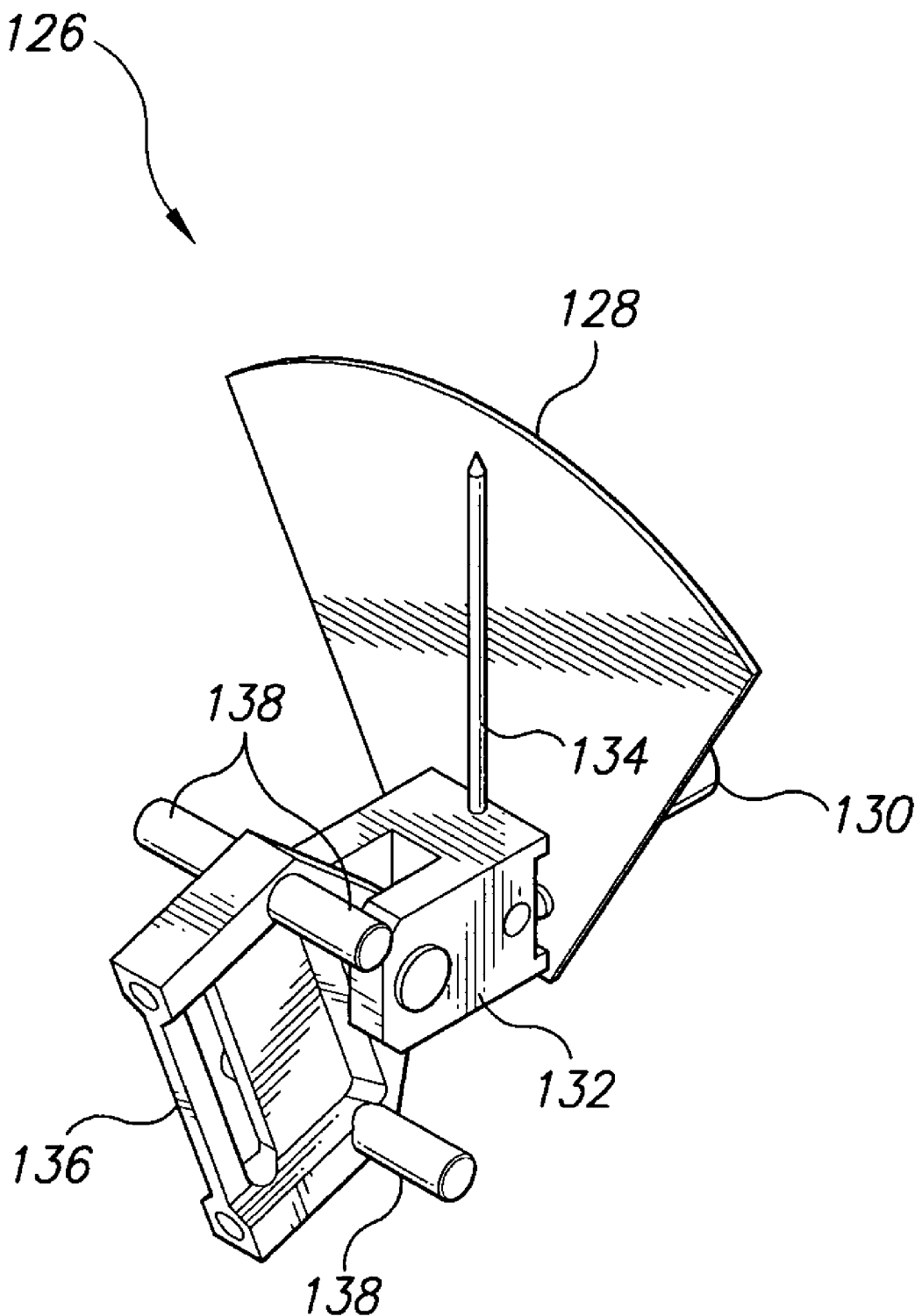
FIG. 5C is a detailed perspective view of the protractor assembly shown in use in FIG. 5B.

Alternatively, the fitting 116 may be used to secure a protractor assembly 126 removably thereto. FIG. 5B illustrates such a protractor assembly 126 installed upon the distal arm end attachment fitting 116 of the articulated arm assembly 100, with FIG. 5C providing a front perspective view of the protractor assembly. The protractor assembly 126 includes a protractor scale 128 from which a fitting attachment pin 130 extends, with the attachment pin 130 removably installing within the receptacle 124 of the distal arm end fitting 116 of the arm assembly 10. The attachment pin 130 and/or scale 128 may be keyed to the end fitting 116, to preclude relative rotation between the two components. However, the orientation of the protractor scale 126 may be adjusted relative to the end fitting 116 to measure angles relative to different axes or orientations.

An indicator block 132 extends pivotally from the protractor scale 128, with an indicator needle or pointer 134 immovably affixed to the indicator block 132 and extending across the face of the protractor scale 128. As the indicator block 132 rotates relative to the scale 128, the needle or pointer 134 sweeps across the scale 128 to indicate the angle of rotation of the indicator block relative to the scale. The indicator block 132 is aligned with the object of interest (e.g., face of a golf club head, etc.) by means of a contact block 136, which is aligned with the surface, edge, or other feature of interest of the object. A series of alignment pins 138 may be provided extending from the contact block 136, to further aid in the precise placement and alignment of the contact block 136 relative to the object of interest.

The protractor assembly 126, comprising the above-described components, is used to measure such properties as the CG angle (once the location of the center of gravity relative to the three axes has been determined, as described further above). Other linear dimensions such as the face center CF, vertical height of the center of gravity (V dimension), center of gravity relative to the lie angle origin (C dimension), and rearward center of gravity (RCG) may also be determined relative to the center of gravity, once the center of gravity CG has been found. These various properties or dimensions are noted in the appropriate positions 610 through 618 of the table 600 illustrated in FIG. 6. Other dimensions or properties of the subject club head are determined by means of appropriate tools and equipment, e.g., loft angle gauges, etc.

The articulated arm assembly 100, with the marker M or protractor assembly 126 secured thereto, may be translated across or over the base platform 12 by means of a series of mutually orthogonal tracks, as shown in FIG. 1 of the drawings. A first pair of spaced apart, parallel, stationary tracks 140a and 140b is immovably affixed to the base platform 12, with one of the tracks adjacent each of two opposed edges of the base 12. The stationary tracks 140a, 140b are oriented with their lengths parallel to the length of the balance beam 38. A second movable track 142 is oriented orthogonally to the first two tracks 140a and 140b, with each end of the second track 142 being affixed to one of the two stationary tracks. The second track 142 slides or rolls along the two stationary tracks 140a, 140b, toward or away from the scale platform 16 and its scale 20, and the balance beam 38. The articulating arm assembly 100 is movably affixed to the second track 142 by means of the track engagement channel 104 provided in the track mount 102 (FIGS. 5A and 5B).

The above-described arrangement provides for the adjustable positioning of the articulated arm assembly 100 relative to the gauging block 46 and any object secured thereto installed at the object attachment end 42a of the balance beam 38. In most cases, the line or plane in which the center of gravity of the object is located will not be in alignment with the exact center of the balance beam axis. Thus, it is necessary to be able to move or shift the arm assembly 100 laterally relative to the balance beam along the second track 142, in order to allow for such lateral offset. The movement of the second track 142 along the first two tracks 140a and 140b allows the arm assembly 100 to be adjusted toward or away from the object attachment end 42a of the balance beam 38 to accommodate objects of different sizes, with the track assembly also allowing the articulated arm assembly 100 to be moved well clear of the balance beam for installation, removal, and/or adjustment of an object thereon.

It will be seen that precise positioning of the arm assembly 100 is desired in order to provide precision in marking a club head H or other object secured to the balance beam 38. This is provided by first and second precision adjusters 144a and 144b. The first precision adjuster 144a is immovably affixed to one end of the second track 142, and slides along one of the first tracks (e.g., track 140a). The second precision adjuster 144b is immovably affixed to the track mount 102 of the articulated arm assembly 100, and slides along the second track 142. Each precision adjuster 144a, 144b includes a locking screw 146 to affix the adjuster immovably to its corresponding track, and a threaded fine adjustment 148 for final precision positioning of the arm assembly 100 once it has been approximately positioned as desired.

A separate guide 150 is also provided parallel to the two stationary tracks 140a, 140b, with a digital caliper 152 (or other suitable precision linear measuring device) immovably affixed to the second track 142 and slidably disposed along the guide 150. The digital caliper 152 indicates the relative position of the second track 142 from the object attachment end 42a of the balance beam 38 by measuring the caliper travel along the guide 150, thus indicating the relative position of the articulated arm assembly 100 from an object secured to the object attachment end of the balance beam.

The object secured to the end of the balance beam may be articulated in any of three mutually orthogonal planes by means of the adjustability of the gauging block 46 in its attachment bracket 48 and the rotation of the object of interest on the pin adapter 60, as noted further above. It has also been noted that the base plate 106, support 110, and arms 112a through 114b of the articulated arm assembly 100 may be rotated relative to the track mount 102 to a position orthogonal to that shown in FIG. 1. This allows the arm assembly 100 to be oriented with the length of the marking implement M normal to the axis of the balance beam 38. When this orientation is set with the device 10, the position of the marking implement M relative to the club head C may be set relative to some reference point, and the digital indicator or caliper 152 zeroed.

The second track 142 is then adjusted to position the marker M approximately as desired, with the fine adjuster 144a used to set the alignment of the marker M precisely according to the digital readout of the instrument 152 per the figure recorded previously in the appropriate CG positions 604 through 608 of the table 600 for the X, Y, and Z axes of the object. The process is repeated for each axis until a line representing the plane of the CG in each of the mutually orthogonal X, Y, and Z axes is marked upon the object. The intersection of the three planes defines the precise center of gravity of the object.

In conclusion, the device for determining the center of gravity of an object will be much appreciated by professionals in many fields, particularly those technicians who construct, repair, and modify golf clubs for optimum performance. The device enables the technician to determine the precise center of gravity of the club head. Such knowledge is needed for precise modification of the club head. Using the device, the technician can modify an existing club head to tailor the center of gravity properties precisely as required for the golfer. Professional golfers will find the present machine or device to be of particular value, considering the financial levels of the professional game. However, skilled amateur players will also appreciate the fine adjustment made possible by the present device as well, and technicians in other fields who have need to establish the precise center of gravity of an irregularly shaped object will also find the present device to be of great value.

It is to be understood that the present invention is not limited to the embodiments described above, but encompasses any and all embodiments within the scope of the following claims.

I claim:

1. A device for determining the center of gravity of an object, comprising:
    a base platform;
    a weighing scale platform disposed atop the base platform;
    a balance beam fulcrum disposed atop the weighing scale platform;
    an elongate balance beam disposed upon the fulcrum, the balance beam including a scale engagement arm extending from the fulcrum, the scale engagement arm having a distal scale engagement end, and an object attachment arm extending from the fulcrum opposite the scale engagement arm, the object attachment arm having a distal object attachment end;
    a double action weighing scale disposed atop the weighing scale platform;
    a weighing pan disposed atop the scale, the pan having an upper surface and a lower surface opposite the upper surface, the scale engagement end of the scale engagement arm of the balance beam being disposed between the scale and the pan, the scale engagement end of the scale engagement arm selectively engaging the lower surface of the pan;
    a gauging block attachment bracket affixed to the object attachment end of said balance beam, the bracket having first and second mutually orthogonally opposed edges;
    a gauging block pivotally extending from said gauging block attachment bracket, the block having laterally opposed, first and second stop flanges extending therefrom, the flanges selectively engaging the edges of the gauging block attachment bracket; and
    an alignment index adjustably orthogonal to the first and second stop flanges;
    whereby the weighing scale registers the weight of an object placed upon the upper surface of the weighing pan and registers the upward force produced by an object disposed at the object attachment end of the balance beam.

2. The device for determining the center of gravity of an object according to claim 1, wherein said scale comprises a programmable electronic load cell device.

3. The device for determining the center of gravity of an object according to claim 1, further including a balance beam latch and centering assembly disposed atop said fulcrum and across said balance beam.

4. The device for determining the center of gravity of an object according to claim 1, further including a golf club head hosel pin adaptor removably and pivotally secured to said gauging block.

5. The device for determining the center of gravity of an object according to claim 1, further including:
    an adjustably positionable articulated arm assembly disposed generally opposite the object attachment end of said balance beam, the arm assembly having a base and a distal end opposite the base; and
    a marking implement holder removably disposed upon the distal end.

6. The device for determining the center of gravity of an object according to claim 5, further including:
    a first pair of stationary, parallel tracks; and
    a second track movably disposed across said first pair of tracks, the second track being orthogonal to the first pair of tracks, said articulated arm assembly being movably secured to the second track.

7. A device for determining the center of gravity of an object, comprising:
    a balance beam fulcrum;
    an elongate balance beam disposed upon the fulcrum, the balance beam having a scale engagement arm extending from the fulcrum, the scale engagement arm having a distal scale engagement end, and an object attachment arm extending from the fulcrum opposite the scale engagement arm, the object attachment arm having a distal object attachment end;
    a double action weighing scale;
    a weighing pan disposed atop the scale, the pan having an upper surface and a lower surface opposite the upper surface, the scale engagement end of the scale engagement arm of the balance beam being disposed between the scale and the pan, the scale engagement end of the scale engagement arm selectively engaging the lower surface of the pan;
    an adjustably positionable articulated arm assembly disposed generally opposite the object attachment end of said balance beam, the arm assembly having a base and a distal end opposite the base; and
    a marking implement holder removably disposed upon the distal end;
    whereby the weighing scale registers the weight of an object placed upon the upper surface of the weighing pan and registers the upward force produced by an object disposed at the object attachment end of the balance beam.

8. The device for determining the center of gravity of an object according to claim 7, wherein said scale comprises a programmable electronic load cell device.

9. The device for determining the center of gravity of an object according to claim 7, further including a balance beam latch and centering assembly disposed atop said fulcrum and across said balance beam.

10. The device for determining the center of gravity of an object according to claim 7, further including:
    a gauging block attachment bracket affixed to the object attachment end of said balance beam, the bracket having first and second orthogonally opposed edges;
    a gauging block pivotally extending from the gauging block attachment bracket, the block having laterally opposed first and second stop flanges selectively engaging the edges of the gauging block attachment bracket; and
    an alignment index adjustably orthogonal to the first and second stop flanges.

11. The device for determining the center of gravity of an object according to claim 10, further including a golf club head hosel pin adaptor removably and pivotally secured to said gauging block.

12. The device for determining the center of gravity of an object according to claim 7, further including:
- a first pair of stationary, parallel tracks; and
- a second track movably disposed across the first pair of tracks orthogonal thereto, said articulated arm assembly being movably secured to the second track.

13. A device for determining the center of gravity of an object, comprising:
- a balance beam fulcrum;
- an elongate balance beam disposed upon the fulcrum, the balance beam including a scale engagement arm extending from the fulcrum, the scale engagement arm having a distal scale engagement end, and an object attachment arm extending from the fulcrum opposite the scale engagement arm, the object attachment arm having a distal object attachment end;
- a double action, programmable electronic load cell weighing scale;
- a weighing pan disposed atop the scale, the pan having an upper surface and a lower surface opposite the upper surface, the scale engagement end of the scale engagement arm of the balance beam being disposed between the scale and the pan, the scale engagement end of the scale engagement arm selectively engaging the lower surface of the pan;
- an adjustably positionable articulated arm assembly disposed generally opposite the object attachment end of said balance beam, said arm assembly having a base and a distal end opposite the base; and
- an apparatus removably disposed upon the distal end, said apparatus being selected form the group consisting of a marking implement holder and a protractor;
- whereby the weighing scale registers the weight of an object placed upon the upper surface of the weighing pan and registers the upward force produced by an object disposed at the object attachment end of the balance beam.

14. The device for determining the center of gravity of an object according to claim 13, further including a balance beam latch and centering assembly disposed atop said fulcrum and across said balance beam.

15. The device for determining the center of gravity of an object according to claim 13, further including:
- a gauging block attachment bracket affixed to the object attachment end of said balance beam, the bracket having first and second orthogonally opposed edges;
- a gauging block pivotally extending from the gauging block attachment bracket, the block having laterally opposed first and second stop flanges selectively engaging the edges of the gauging block attachment bracket; and
- an alignment index adjustably orthogonal to the first and second stop flanges.

16. The device for determining the center of gravity of an object according to claim 15, further including a golf club head hosel pin adaptor removably and pivotally secured to said gauging block.

17. The device for determining the center of gravity of an object according to claim 13, further including:
- a first pair of stationary, parallel tracks; and
- a second track movably disposed across the first pair of tracks orthogonal thereto, said articulated arm assembly being movably secured to the second track.

* * * * *